Aug. 5, 1958
E. J. HERBENAR
2,846,251
PERMANENTLY LUBRICATED RESILIENT CONNECTOR
FOR STEERING LINKAGES
Original Filed July 6, 1954
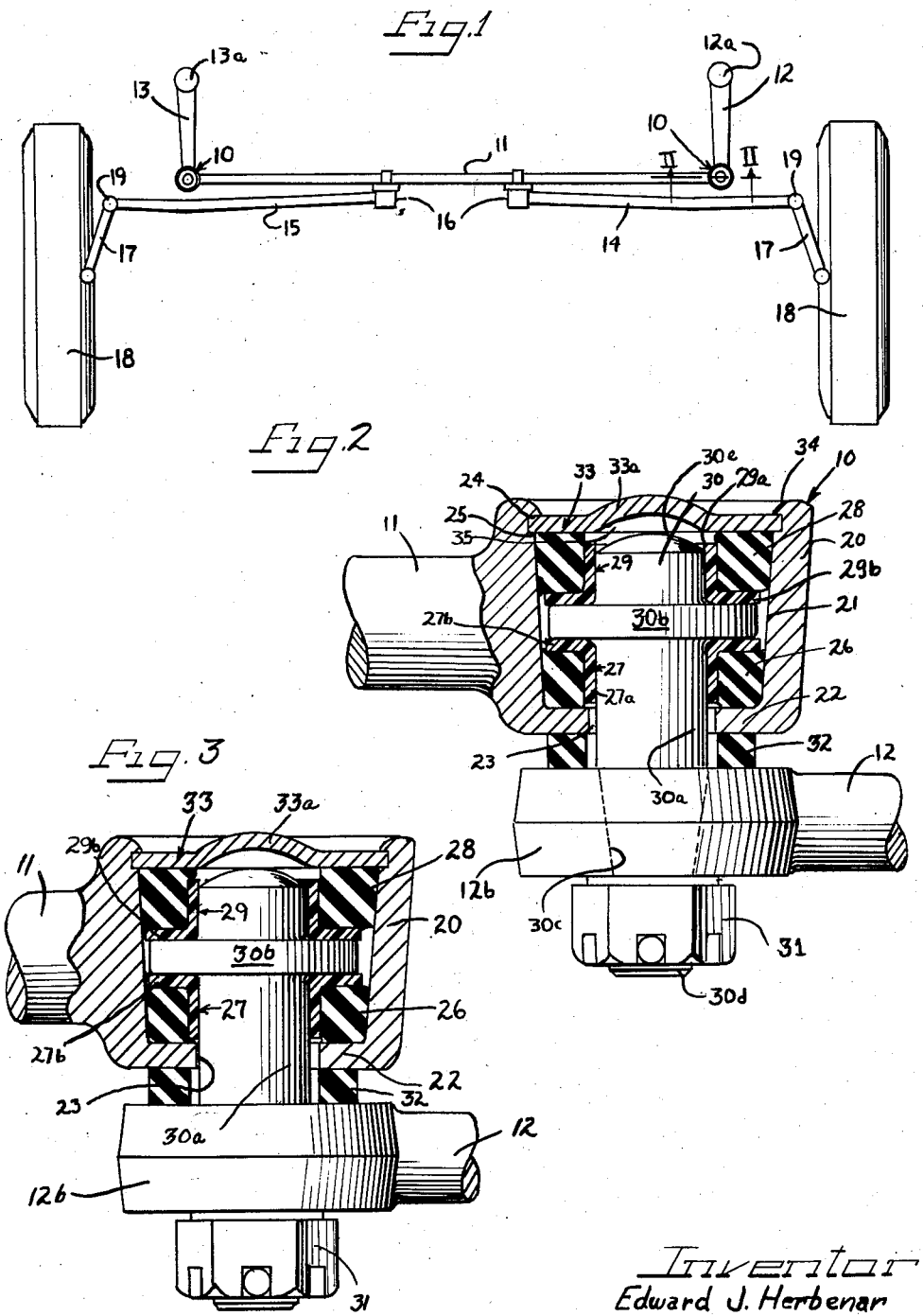
Inventor
Edward J. Herbenar United States Patent Office 2,846,251
Patented Aug. 5, 1958

2,846,251

PERMANENTLY LUBRICATED RESILIENT CONNECTOR FOR STEERING LINKAGES

Edward J. Herbenar, Detroit, Mich., assignor to Thompson Products, Inc., Cleveland, Ohio, a corporation of Ohio Original application July 6, 1954, Serial No. 441,541, now Patent No. 2,778,664, dated January 22, 1957. Divided and this application June 13, 1956, Serial No. 591,139

5 Claims. (Cl. 287—85)

This application is a division of my copending application Serial No. 441,541 filed July 6, 1954, now United States Patent No. 2,778,664.

This invention relates to connecting joints especially adapted to provide rotative motion with a limited amount of angular motion without requiring adjustments or lubrication during use.

Specifically, this invention deals with permanently lubricated resilient connecting joints for vehicle steering linkages or the like and having excellent shock dampening characteristics while accommodating relative rotation of the parts together with a limited relative angulation of the parts while remaining efficiently effective in transmitting lateral motion.

The invention will hereinafter be described as embodied in joints for connecting the cross-link with the pitman arm and the idler arm of an automotive steering linkage but it should be understood that the invention is not limited to such particular usage since the principles of the invention are generally applicable to connecting joints where the major function of the joint is to transmit shifting movement while accommodating relative rotation with a limited amount of angular motion.

In accordance with this invention, the ends of a cross-link of an automobile steering linkage have socket housings in which are mounted plastic bearing sleeves backed by solid resilient bushings. Metal studs are rotatably mounted in the sleeves and project from the socket housings to be attached to the pitman arm and idler arm respectively of the linkage. The socket housing is initially packed with lubricant which will last throughout the operating life of the joint. The bushing is preloaded in the socket and is capable of accommodating relative tilting movements of the stud and socket without interfering with the transmission of steering force from the pitman arm to the cross-link. The lateral shifting of the stud and socket parts caused by application of steering force on the linkage will further load the preloaded bushings to increase the form factor thereof and afford a firm transmitting surface to prevent mushy steering while, at the same time, absorbing shock and deadening wheel noises and the like.

The plastic bearing materials are of the type that do not need to be lubricated for efficient operation and include polymeric amides and polyethylene type high polymers such as nylon, Teflon, and the like.

It is then an object of this invention to provide a permanently lubricated resilient connector for vehicle steering linkages which will freely accommodate relative rotation of the parts together with a limited amount of angular displacement of the parts while dampening shock and deadening noise.

A further object of the invention is to provide a vehicle steering linkage having permanently lubricated resilient connectors at the connecting points thereof where the major function is to provide rotative movement with a limited amount of angular motion.

A still further object of the invention is to provide a stud and socket joint having plastic bearings rotatably supporting the stud in the socket and possessing a low coefficient of friction and an ability to operate without lubrication together with synthetic oil-resistant rubber compounds supporting the bearings to absorb shock, deaden noise, and accommodate limited angular displacement of the socket and stud without interfering with efficient transmission of steering movements between the parts.

Another object of the invention is to provide a joint for a steering linkage which will firmly transmit steering movements while accommodating rotation and limited tilting and, at the same time, absorbing noise and dampening shock.

A still further object of this invention is to provide a rubber bushed plastic bearing support for a joint stud which will progressively resist deformation upon application of lateral forces on the stud supported by the bearing.

Other and further objects of the invention will be apparent to those skilled in the art from the following detailed description of the annexed sheet of drawing which, by way of preferred examples only, illustrate several embodiments of the invention.

On the drawing:

Figure 1 is a somewhat diagrammatic plan view of a steering linkage having the resilient connectors of this invention;

Figure 2 is an enlarged cross-sectional view, with parts in elevation, taken along the line II—II of Figure 1; and Figure 3 is a view similar to Figure 2 but illustrating the parts in shifted position for transmission of steering motion.

As shown on the drawing:

The joints 10 of this invention are illustrated in Figure 1 as connecting the cross-link 11 of a vehicle steering linkage with the pitman arm 12 and the idler arm 13 of the linkage. Tie rods 14 and 15 are connected to the central portion of the cross-link 11 through joints 16 and have their outer ends connected to the steering arms 17 of the vehicle wheels 18 by joints 19. As is customary, the pitman arm 12 is mounted for swinging about a fixed axis 12a while the idler arm is mounted for swinging about a fixed axis 13a. The joints 10 accommodate swinging of the idler arm and pitman arm about their fixed axes by relative rotation of the joint parts and also accommodates limited angular relative motion between the cross-link and the arm. In addition, the joint 10 at the pitman arm 12 must efficiently convert the swinging movement of the stud into lateral shifting of the cross-link 11 for shifting the steering arms 17 to turn the wheels 18. A firm transmission of this steering motion is necessary to prevent mushy steering.

As shown in Figure 2, the joint 10 includes a cup-shaped socket housing 20 on the end of the cross-link 11. The housing 20 has a tapered bore 21 extending from the open top thereof to an apertured bottom wall 22 having an aperture 23 through the center thereof. The open top of the housing is counterbored at 24 to provide a radial shoulder 25 inwardly from the end of the housing.

A first solid elastomeric ring 26 composed of an oil-resistant rubber compound is seated in the bore 21 on the bottom 22 and has a central aperture aligned with the aperture 23. A plastic bearing 27 of the type having a low coefficient of friction, even when dry and free from lubrication, has a tubular portion 27a thereof lining the aperture of the ring 26 and an outturned flange portion 27b thereof overlying the top of the ring.

A second oil-resistant rubber ring 28 is mounted in the bore 21 adjacent the counterbore 24 and has a plastic bearing 29 similar to the bearing 27 with a tubular portion 29a in the bore of the ring and with an outturned flange 29b underlying the ring. The two flanges 27b and 29b are in spaced opposed parallel relation.

A stud 30 is mounted in the bearings 27 and 29 and projects freely from the housing through the aperture 23. As shown, the stud 30 has a cylindrical body 30a with an outturned collar 30b intermediate the ends thereof and a tapered portion 30c beneath the housing and converging to a threaded end portion 30d. The cylindrical portion is rotatably mounted in the tubular portions 27a and 29a of the bearings and the collar 30b is disposed between the flanges 27b and 29b of the bearings to provide radial shoulders riding on these flanges.

The pitman arm 12 has an eye end 12b receiving the tapered portion 30c of the stud and a nut 31 on the threaded portion 30d of the stud thrust against the eye on a tapered portion. A rubber washer 32 of oil-resistant rubber compound is interposed between the eye 12b and the bottom wall 22 of the housing 20.

A closure disk or plug 33 composed of stamped metal or the like is seated in the counterbore 24 on the shoulder 25 and is locked in the housing by spinning a portion of the housing over the periphery of the disk as shown at 34.

The central portion of the closure disk 33 is bowed upwardly at 33a to provide a rounded dome above the rounded top end 30e of the stud. A space 35 is provided between the dome 33a and the top 30e and this space can be packed with lubricant at the time of original assembly of the joint.

As illustrated in Figure 3, transmission of steering force from the pitman arm 12 to the cross-link 11 will result in a lateral shifting of the stud 30 in the housing 20 and this lateral shifting will be accommodated by interparticle flow of the elastomeric rings 26 and 28. This will increase the form factor of these rings so that while the initial shifting is somewhat cushioned, a firm solid seating for the stud will soon be built up. At the same time, the interparticle flow of the rubber does not interfere with the bearings 27 and 29 since they are relatively rigid. The stud will, therefore, remain freely rotatable in the bearings to accommodate the relative swinging movements of the pitman arm and cross-link. Any relative displacements of the cross-link and pitman arm or idler arm will also be accommodated by interparticle flow of the rubber rings since the stud is free to tilt relative to the housing through a limited arc. In this connection, the rubber ring or seal 32 will accommodate this relative angular movement of the stud in its housing.

The rubber rings 26 and 28 are preloaded in the housing 20 by forcing the closure cap 33 into position against the ring 28 and this preload on the rings tends to resiliently urge the flanges 27b and 29b of the bearings into good bearing engagement with the collar 30b. This will provide an effective wear takeup and will maintain the parts in good bearing relation throughout a long operating life.

From the above description it will, therefore, be understood that this invention provides a resilient connector accommodating relative rotation of the connected parts throughout a limited range of angular movement while absorbing noise, dampening shock and firmly transmitting lateral movements.

It will be understood that variations and modifications may be effected without departing from the scope of the novel concepts of the present invention.

I claim as my invention:

1. In a steering linkage of the type including a cross-link, an idler arm supporting one end of said link and a pitman arm connected to the other end of said link for shifting the link, the improvement of permanently lubricated resilient connectors between the link and the idler arm and between the link and the pitman arm, said connectors including housings on the link, each said housing having a tapered bore, rubber-bushed bearings in each bore composed of plastic materials having a low coefficient of friction and the ability to operate without lubrication backed by oil-resistant solid elastomeric resilient rings, and studs rotatably carried by said bearings having bearing surfaces in right angular relation riding on said bearings, said bushing accommodating limited angular displacement of the studs and housing and transmitting lateral shifting movements therebetween while absorbing noise and dampening shock.

2. A joint assembly which comprises a housing having an open end and an inturned apertured end wall at the opposite end, a closure cap closing the open end of the housing, spaced opposed plastic bearings in said housing acting against the closure cap and inturned end wall of the housing respectively through respective annular rubber bushings, said bearings having tubular portions extending through the bushings and outturned flange portions overlying the bushings, a stud having cylindrical portions rotatably mounted in the tubular portions of the bearings and radial shoulder portions rotatably mounted on the flange portions of the bearings, and said closure cap loading said rubber bushings to maintain the bearing flanges in good engagement with the shoulders of the stud.

3. A permanently lubricated resilient connector which comprises a housing having a bore therethrough with an apertured end wall at one end of the bore and an opening in the other end of the bore, a closure cap closing said opening and affixed to said housing, a pair of elastomeric resilient rings in said bore respectively bottomed on the end wall and on the closure cap, nonmetallic plastic bearings having tubular portions seated in said rings and outturned flange portions overlying the rings, said outturned flange portions being in spaced parallel relation, a stud projecting freely through the apertured end wall of the housing and having cylindrical portions rotatably seated in the tubular portions of the bearing together with an outturned collar between the flanges of the bearings in rotatable relation thereof, and said closure cap loading said rings to maintain the bearings in contact with the collar.

4. A joint assembly which comprises a housing having an open end and an inturned apertured end wall at the opposite end, a closure cap closing the open end of the housing, spaced opposed plastic bearings in said housing acting against the closure cap and inturned end wall of the housing respectively through respective annular rubber bushings, said bearings having tubular portions extending through the bushings and outturned flange portions overlying the bushings, a stud having cylindrical portions rotatably mounted in the tubular portions of the bearings and radial shoulder portions rotatably mounted on the flange portions of the bearings, and said closure cap loading said rubber bushings to maintain the bearing flanges in good engagement with the shoulders of the stud, said plastic bearings comprising a self-lubricating plastic.

5. A permanently lubricated resilient connector which comprises a housing having a bore therethrough with an apertured end wall at one end of the bore and an opening in the other end of the bore, a closure cap closing said opening and affixed to said housing, a pair of elastomeric resilient rings in said bore respectively bottomed on the end wall and on the closure cap, nonmetallic plastic bearings having tubular portions seated in said rings and outturned flange portions overlying the rings, said outturned flange portions being in spaced parallel relation, a stud projecting freely through the apertured end wall of the housing and having cylindrical portions rotatably seated in the tubular portions of the bearing together with an outturned collar between the flanges of the bearings in rotatable relation thereof, and said closure cap loading said rings to maintain the bearings in contact with the collar, said plastic bearings comprising a self-lubricating plastic material.

(References on following page)

References Cited in the file of this patent

UNITED STATES PATENTS

| | | |
|---|---|---|
| 1,859,777 | Keys et al. | May 24, 1932 |
| 2,461,626 | Booth | Feb. 15, 1949 |
| 2,464,982 | Leighton | Mar. 22, 1949 |
| 2,488,979 | Kogstrom | Nov. 22, 1949 |
| 2,642,318 | Ricks | June 16, 1953 |
| 2,660,908 | French et al. | Dec. 1, 1954 |

FOREIGN PATENTS

| | | |
|---|---|---|
| 634,345 | Germany | Aug. 25, 1936 |